United States Patent [19]

Opfer

[11] Patent Number: 4,708,278
[45] Date of Patent: Nov. 24, 1987

[54] PORTABLE, ELECTRONICALLY CONTROLLED, INTEGRATED, P.C.B. REWORK STATION

[75] Inventor: Gerald D. Opfer, Lakeside, Calif.

[73] Assignee: The United States of America as represented by the Secretary of the Navy, Washington, D.C.

[21] Appl. No.: 829,871

[22] Filed: Feb. 10, 1986

[51] Int. Cl.⁴ .............................................. B32K 3/00
[52] U.S. Cl. ........................................................ 228/20
[58] Field of Search .......................... 228/20, 57, 264

[56] References Cited

U.S. PATENT DOCUMENTS

| | | | |
|---|---|---|---|
| 2,717,190 | 9/1955 | Shoup | 445/2 |
| 3,045,095 | 7/1962 | Usher | 228/20 X |
| 3,411,594 | 11/1968 | Siegel | 228/20 X |
| 3,564,408 | 2/1971 | Schulz et al. | 324/158 F |
| 3,576,494 | 4/1971 | Bahis | 324/73 R |
| 3,843,909 | 10/1974 | Asselborn et al. | 361/334 |
| 4,117,427 | 9/1978 | Krafft et al. | 335/112 |
| 4,117,967 | 10/1978 | Regelson | 228/57 X |
| 4,392,107 | 7/1983 | Gollomp | 324/73 R |
| 4,471,898 | 9/1984 | Parker | 228/20 X |
| 4,602,733 | 7/1986 | Slack | 228/264 X |
| 4,620,659 | 11/1986 | Holdway | 228/264 X |

Primary Examiner—Kenneth J. Ramsey
Attorney, Agent, or Firm—Robert F. Beers; Ervin F. Johnston; Thomas Glenn Keough

[57] ABSTRACT

A portable work center is a self-contained, electronic, electro-mechanical, bench top work unit used in the servicing of electronic circuits and specifically printed circuit boards. Solder iron temperature adjust control functions, a continuously variable vacuum or pressure control function, a mechanical rotary drive power control function, low voltage hand tool power supply function, and alternate foot switch control unit, a digital display input for control and function selection, digital displays of status, solid state control logic circuit for operation, and auxiliary control power outlets are integrally contained in the unit to provide for in situ servicing of printed circuit boards.

7 Claims, 11 Drawing Figures

PORTABLE, ELECTRONICALLY CONTROLLED, INTEGRATED, P.C.B. REWORK STATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Electronic components whether individually or combined on a printed circuit board, can and do fail. Testing, repairing and replacement often times is a laborious, time consuming, procedure by skilled technicians that provide service in well equipped laboratories or repair facilities. Usually even the simplest electronic device must be sent to a centrally located repair center when a defect is suspected or known. After the suspect part arrives at the repair center, it is taken in turn, repaired and returned to the user. This is a time consuming procedure that creates a downtime for the electronic components associated with the defective part. As is sometimes the case, the suspected part is not in fact the one that is defective so that yet another period of non-operation for the associated electronics is in store while the truly defective part is sought out, sent to the repair facility, repaired and returned.

Production facilities cannot tolerate this type of downtime. Duplication of electronic controls, processing and associated components is not cost effective where capital expenditures are excessive. Furthermore, heavily trafficked activities such as those associated with avionics, mass transportation control and the like simply cannot afford to be inoperable for any appreciable time due to faulty electronics. Rescue, medical and military applications all have human lives depending upon the reliability of a wide variety of electronics and associated devices. These situations simply cannot be put on hold but must proceed as best they can usually in remote places and in unfavorable conditions.

Where in site repairs have been attempted, the prior methods utilize mechanical toggle switches, variable phase controls, variable transformers and combinations of the same which produce destructive transient voltage spikes to many modern, sophisticated, integrated circuits. Generally speaking, the line level voltages which are coupled to the instruments under test produce excessive electrical noise and in addition to the voltage spikes can be hazardous to solid state components.

Thus, there is a continuing need in the state of the art for a portable work center having essential testing and repair capabilities that does not generate destructive signals for circuits such as those associated with modern integrated circuit boards.

SUMMARY OF THE INVENTION

The present invention is directed to providing a self-contained, electronic, electro-mechanical benchtop work center for servicing printed circuit boards. The center has a pair of solder iron temperature adjust controls, an air pressure differential apparatus for removing the solder; a hand held, mechanical rotary grinder; a reliable low voltage, high current, accessory hand tool power supply; a two-position foot switch capable of operating either the pressure differential control, the mechanical rotary grinder or the low voltage power supply; digital data input for control and function selection; digital displays of the status of the soldering irons and the low voltage hand tool power supply; control logic for operation and auxiliary control power outlets. The combined self-contained components assure in site servicing of printed circuit boards.

A prime object of the invention is to provide for a portable printed circuit board rework center.

Another object is to provide for a portable work center for reducing the possibility of further damaging printed circuit boards being repaired.

Still another object is to provide for a portable work center that reduces the possibility of generating damaging transient voltage spikes.

Yet another object of the invention is to provide for a portable work center having a pressure differential air supply for removing the by products of soldering and other operations in the circuit region.

Still another object of the invention is to provide for a portable work center having the capability for interfacing with auxiliary outlets, pressurized gas sources and having the capability for removing transients from the auxiliary power supplies.

Still another object is to provide for a portable work center that is compact, yet provides for a selection and control level adjustment of all functions thereon.

Still another object of the invention is to provide for a portable work center having digital displays of the settings of all the instruments thereon as well as having a foot control to enable free use of the operator of both hands.

Still yet another further object is to provide for a portable work center having control logic that assures a transient free unit with zero voltage power switching controls in all functions.

Still yet a further object is to provide a portable work center having but a single control for line voltage to assure greater safety and to have combinations of electronic switches for greater versatility and combinations of desired functions.

Another object is to provide a portable work center having a reduced possibility of physical wear-out due to the use of an electronic data entry terminal keyboard as opposed to mechanical toggle switches and potentiometers.

These and other objects of the invention will become more readily apparent from the ensuing specification when taken with the language of the appended claims in conjunction with the attached drawings.

DESCRIPTION OF THE PREFERRED EMBODIMENT

Figure 1:
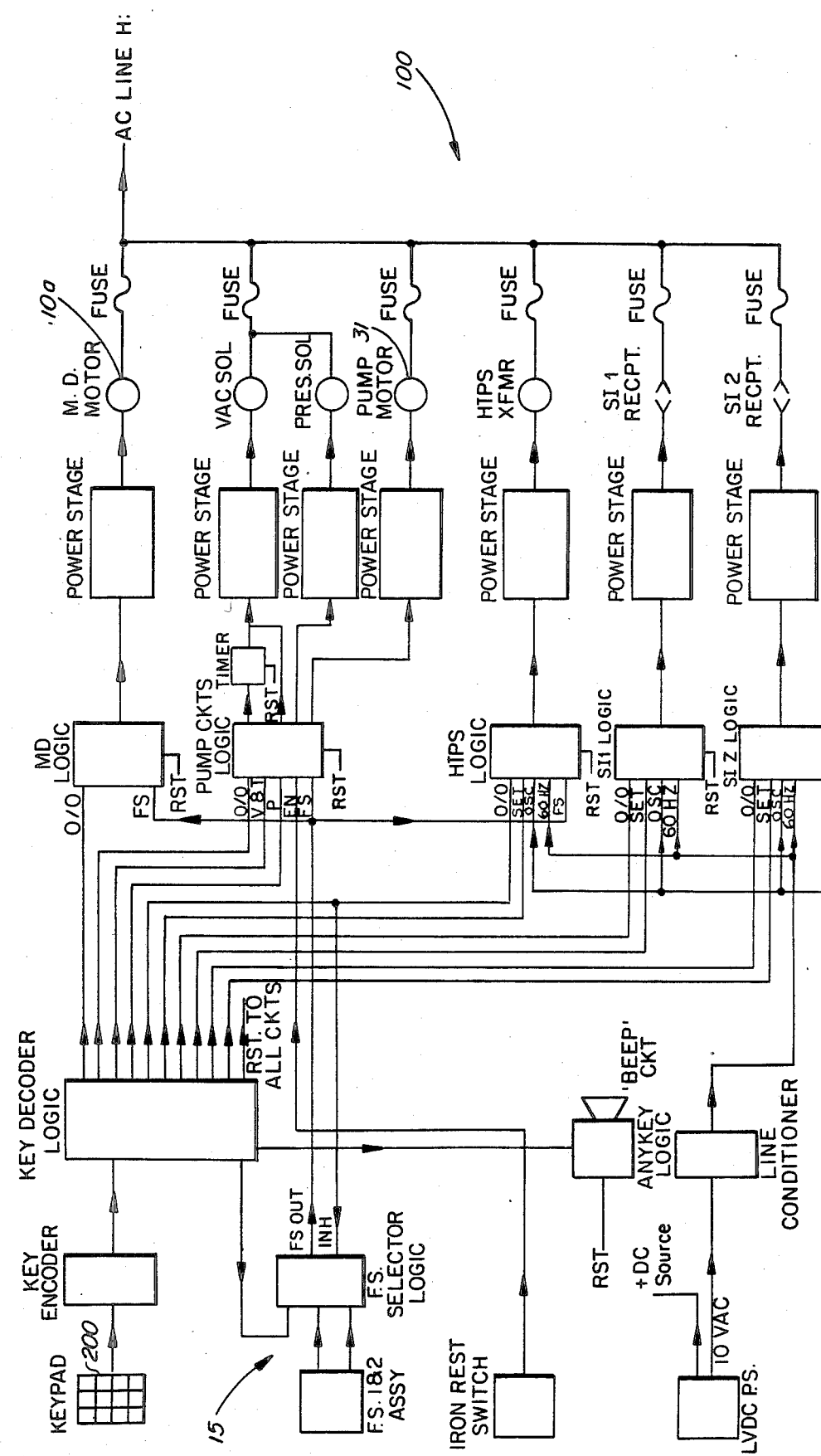
FIG. 1 is a schematic diagram of the principle constituents of the portable work center.

Referring now to FIG. 1 of the drawings, a functional block diagram of the portable work center (PWC) 100 enables an in site servicing of electronic circuits and in particular printed circuit boards. It is a small portable unit that can be fabricated with state of the art components in the manner disclosed below to have overall dimensions of less than twenty inches by eight by ten and its weight would be approximately forty-five pounds. It provides the operator with a simple, versatile, self-contained source of safe, low electrical noise generating power, controls soldering irons, mechanical drive motors, and an air pump for use in the repair of modern printed circuit boards.

Figure 2:
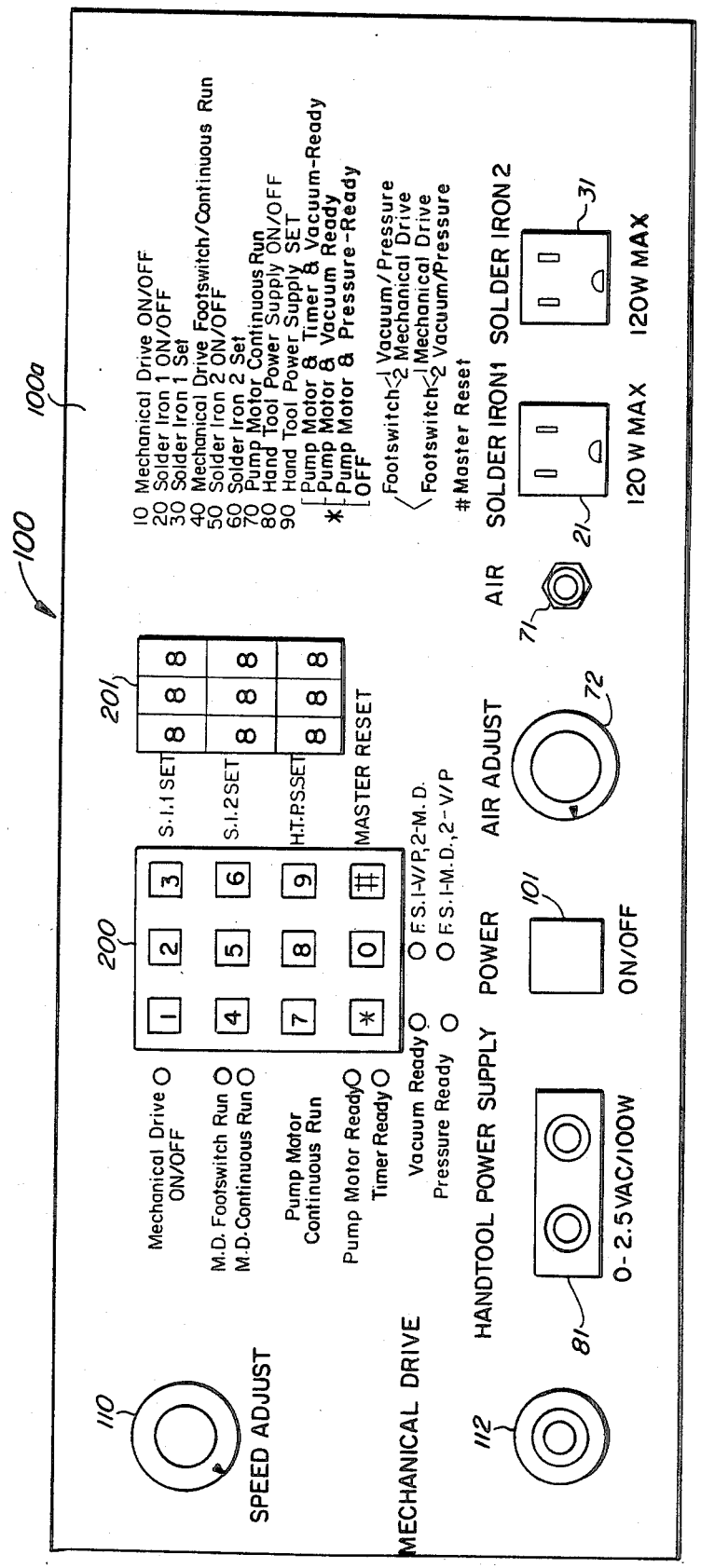
FIG. 2 shows a front view of the front panel mounting the keypad.

The portable work center provides a single keypad 200 that is conveniently located on the front panel 100a of the unit, see FIGS. 1 and 2. The numbers assigned to each button within the keypad corresponds to a separate function of the PWC and are enumerated in like ten to the first power on the panel cover. An operator need merely depress the button corresponding to the desired function and this capability is available for immediate use. A single power on/off switch 101 provides power for all functions and is coupled to the center only through this switch.

Figure 3A:
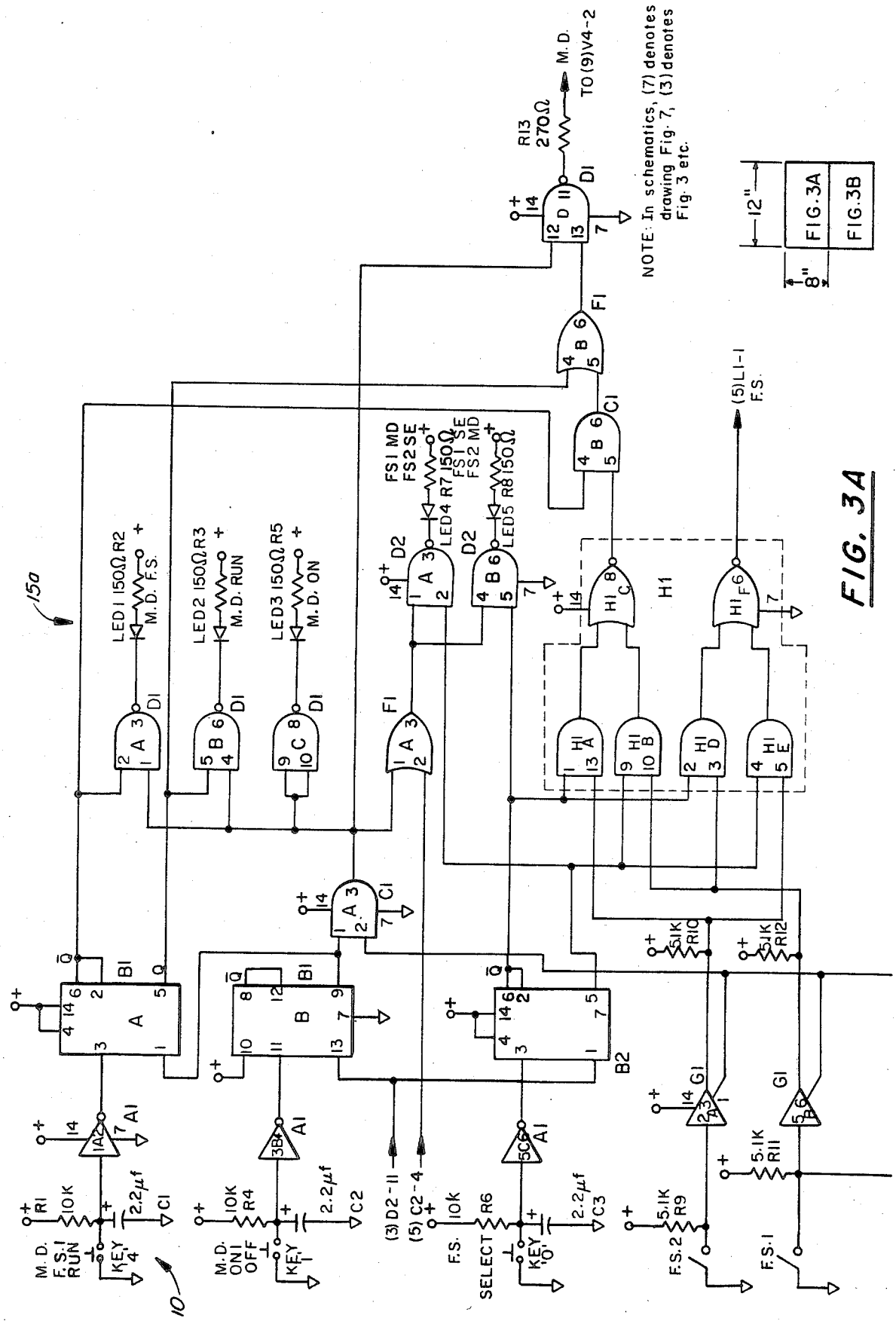
FIGS. 3A and 3B are detailed schematic drawings of the mechanical drive motor circuits.

The function associated with the push button 1 on keypad 200 is to turn off or on a motor 10a in mechanical drive function 10. This function provides rotary power, continuously variable by an adjustment 110 to a quick connect panel jack 112 on the front of the PWC housing. A flexible shaft and adjustable hand piece are fitted into the quick connect panel jack and provide the user with a one-seventh of horsepower of drilling, milling, grinding, etc. The drive motor may be run continuously or switched on and off after key button 4 is selectively actuated by a selected foot switch F.S., when key button 0 is depressed. Its operational mode is indicated on in LEDs shown on the front panel of the PWC in FIG. 2 and coupled as shown in FIG. 3A. In this regard, all of the functions discussed have LEDs associated with them to provide an operator with an indication of what function is in operation.

A first soldering iron on-off function 20 is associated with key button 2 on keypad 200 along with soldering iron temperature set function 30 with key button 3. Simultaneously, a second on-off soldering iron on-off function 50 is actuated via key-button 5 along with a temperature function 60 via key button 6. They provide wattage adjustment from 50 per cent to 100 per cent of the rated iron wattage and are adjusted in 5 per cent increments to 120 watts for the two soldering-iron output terminals 21 and 31 respectively.

Figure 10:
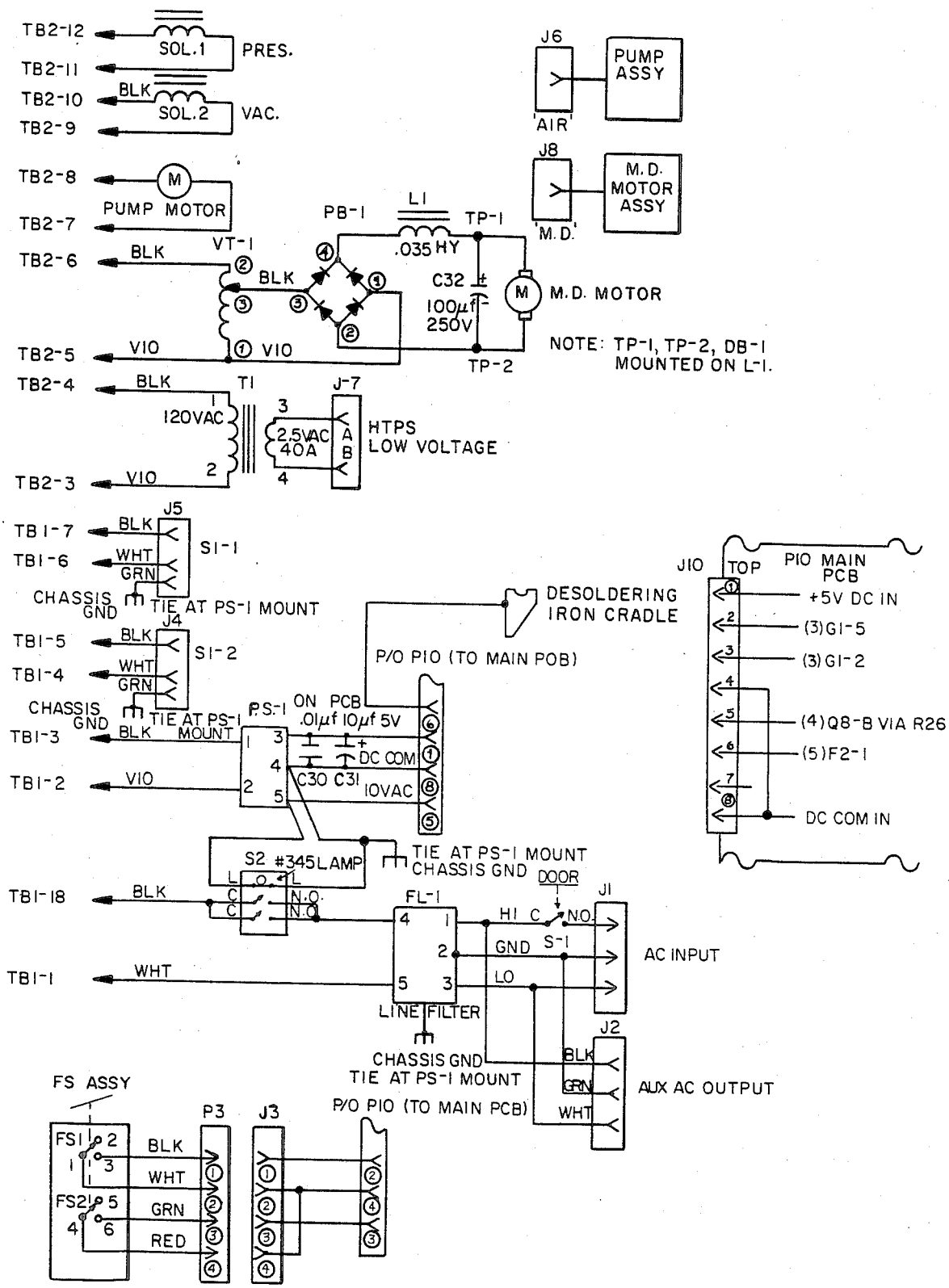
FIG. 10 contains circuit elements included in the portable work center to facilitate reliable operation thereof.

An air pump or pressure differential function 70 is operatively associated with push button 1 on keypad 200. The purpose of the pump function is to continuously provide a variable vacuum or pressure instantly on demand at a front panel fitting 71. An air adjustment control 72 may be coupled to the fitting to vary the flow. The pump motor operation may be initiated by removal of a desoldering iron from its rest cradle, see FIG. 10, or may be run continuously when it supports either of the soldering functions. Either vacuum or pressure is selectable and use is initiated by foot switch 15 with the appropriate mode of operation being indicated on the PWC front panel. A variable timer may be included and, if selected, is particularly useful when the PWC is to function in the vacuum mode. The timer prevents tip clogging and is initiated by the foot switch. Vacuum may be used for desoldering, vacuum pick-up of parts or any other applications requiring vacuum at 0.5 cu. ft. at 15" Hg. Air pressure may be used for reflow soldering, to soften conformal coatings or, as a cool air source, to spray conformal coatings, blow away chips, and the like. A pump motor 31, FIG. 1, is a commercially available unit.

The low voltage hand tool power supply function 80 is initiated by depressing the push button switch 8 on keypad 200. A hand tool power supply magnitude function 90 is provided for by depressing key button 9. These assure a low voltage hand tool power supply HTPS at two front panel connectors 81, a 0-2.5 VAC/100 watt supply. The HTPS is controlled by foot switch when properly actuated and is used for resistance soldering, thermal stripping or eyelet fusing to printed wiring. A soldering iron 1 and 2 standby capability is initiated when button 8 of the keypad is depressed.

A timer function for the foot switch is initiated when button * of the keypad is depressed and can be included to responsibly actuate the vacuum or air pressure or the drive motor or the HTPS. Master reset # erases all functions and returns the PWC to a ready state as long as power switch 101 is on.

The keypad provides for the selection of all of the functions of the portable work center as well as most control level adjustments. A keyboard display 201 gives a digital indication of the condition of each selected function. Within the PWC, solid state control and zero voltage power switching provide a transient free unit. The following discussion of the constituents of the circuit diagrams forming the functions outlined above avail themself of the latest advances in the state of the art and assure zero voltage power switching controls of all functions. The use of opto-couplers provides maximum (7500 volts line isolation) of protection to the logic control circuitry.

In the following explanation of the detailed circuit diagrams, for those keys on keyboard 200 which represent a toggle switch type of operation, the following is typical: a key switch is debounced by a RC network at the input to a Schmidt trigger inverter whose output toggles a flip-flop which stores the on or off state desired. Hereinafter, this circuit will be referred to as the key with whatever other numerical designation as applies. For those keys on the keyboard which represent a momentary switch type of operation the following is typical; a key switch is debounced by a RC network at the input to a Schmidt trigger inverter whose output maintains for the duration of the key closure and hereinafter will be referred to as the key with whatever numerical designation from the keypad is ascribed to it. All the flip-flops used in the portable work center will, at reset, have $\bar{Q}$ high (logic 1). All line rated loads use an opto-coupled triac driver module, a power triac, a RC "snubber" network and a fuse and shall hereinafter be referred to as the power stage. Further, the power stage may be initiated by a logic 1 or a logic 0 which shall hereinafter be referred to as the output signal.

Figure 3B:
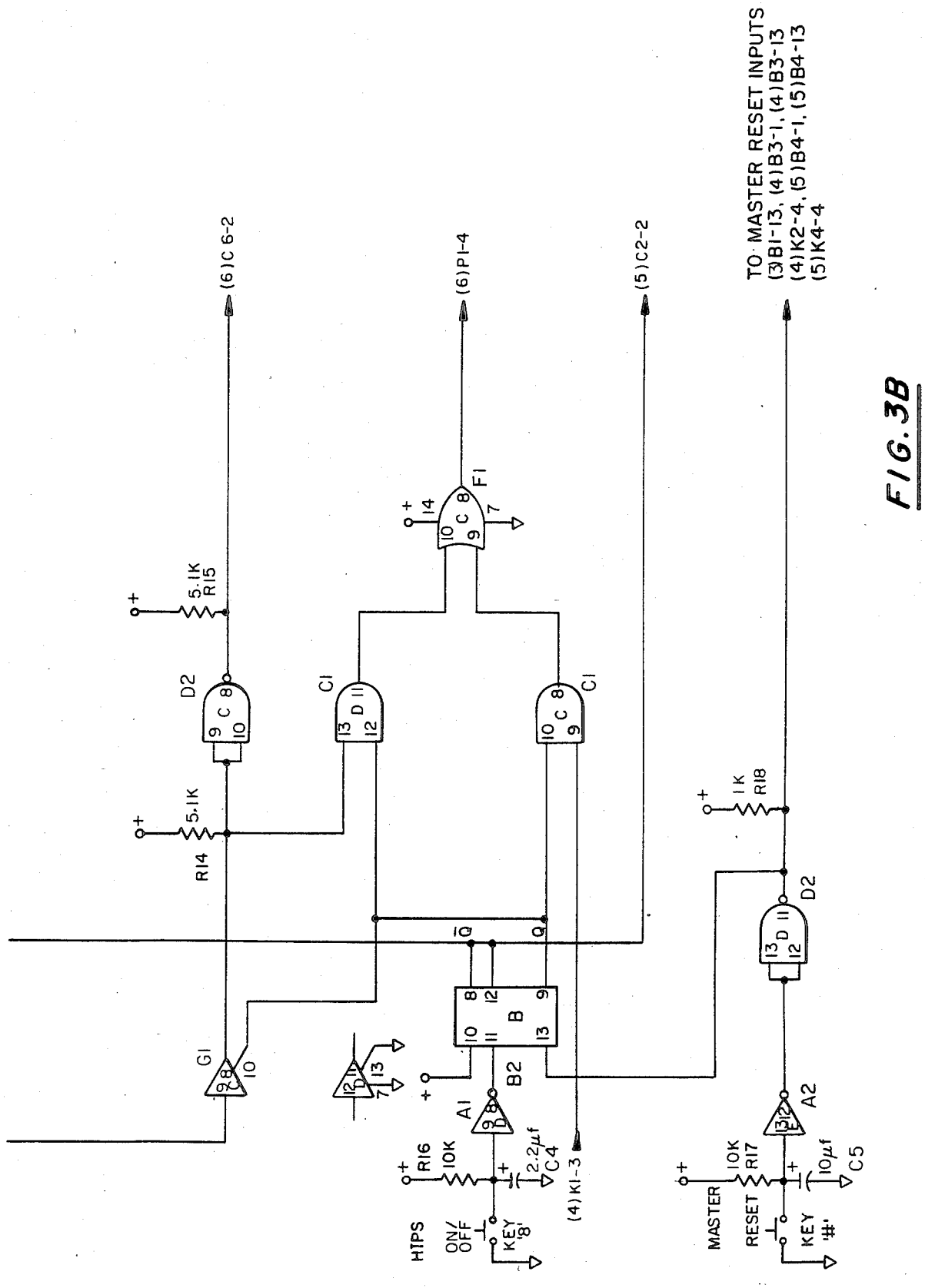

Referring now to FIGS. 3A and 3B of the drawings, depressing key 1 enables the mechanical drive (MD) motor circuits associated with motor 10a. Integrated circuit (IC) C1-A is part of the function interlock system which prevents a mechanical drive operation whenever the hand tool power supply (HTPS) is on, functions 80 and 90. When off, the HTPS $\overline{Q}$ line is high and IC C1-A is enabled. Actuation of key 4 on keypad 200 selects in which mode the mechanical drive can be operated (foot switch (FS) which is normal at turn-on, or in continuous run (RUN) when key 4 is on). Light emitting diodes (LEDs) 3, 1 or 2 denote mechanical drive on, and foot switch or run operation respectively. The output of IC-C1-A enables the MD output control gate IC-D1-D as well as the foot switch selected displays LED 4 and 5. At turn-on, LED 5 will depict that foot switch 1 (FS1) has been assigned to control the solenoids (SE) and that foot switch 2 (FS2) has been assigned to control the MD motor 12a.

Depressing key "0" simply reverses the above foot switch assignments with each closure. When reversed, LED 4 depicts the new assignment. The foot switch select circuit consists of the key "0", $\overline{Q}$ and Q outputs and all IC-H1. IC-G1, A and B are permitted to pass the FS2 and FS1 closure signal to the selector select only when their control pins are high (HTPS off). Since key "0", $\overline{Q}$ and Q outputs alternate on each key closure, IC-H1 sections A and D and sections B and E are alternately enabled. The FS2 and FS1 inputs are, therefore, each alternately available at the outputs of IC-H1-C and F. The resulting signal at IC-H1-C and F is a logic 1 output for the corresponding foot switch (FS) closure.

Foot switch 1 also is input to IC-G1-C. The control pin of this gate, however, goes to key 8-Q output. Key 8-Q only goes high (enabled) when the HTPS has been turned on. When key 8-Q is high, $\overline{Q}$ is low and the foot switch select circuit is inoperable but now FS1 is enabled through to control the HTPS circuits.

Key 8 enables the HTPS circuits and disables the MD and SE circuits as well as all their LED indicators. At turn-on of key 8, Q output goes high enabling IC-C1-D and IC-C1-C and IC-G1-C. IC-C1-D now has two highs and outputs a steady logic 1 to the OR gate IC-F1-C. The output of IC-F1-C will be high if either input is high, therefore a logic 1 is output to the HTPS display blanking input, refer to in FIG. 6 and its accompanying disclosure, turning on the display. FS1 and FS2 are part of a single actuator. Two position switch FS1 can be closed and FS2 stay open but FS1 must close and stay closed to actuate FS2. Closing FS1 places a low on one input of IC-C1-D disabling that gate. Now IC-F1-C has a low at one input and an alternating signal at the other input. The alternating signal is a 1.5 Hz signal at an input to enabled IC-C1-C. The alternating signal is applied to the HTPS display blanking input causing the display to blink on and off at 1.5 Hz. The blinking is the operator signal that there is now the selected voltage at the panel terminals of the HTPS. Closing FS-1 places a low on the input to inverter IC-D2-C. The output is a high which is applied to the output control gate of the HTPS enabling the control signal to be applied to the power stage. Refer to page 6 and its accompanying discussion for a further explanation of the operation of the HTPS.

Looking to FIG. 3B, key # produces a master reset (MRST) signal which is applied to the various control circuits. When initiated, this signal resets the portable work center to an all off condition except for the main power status.

Figure 4:
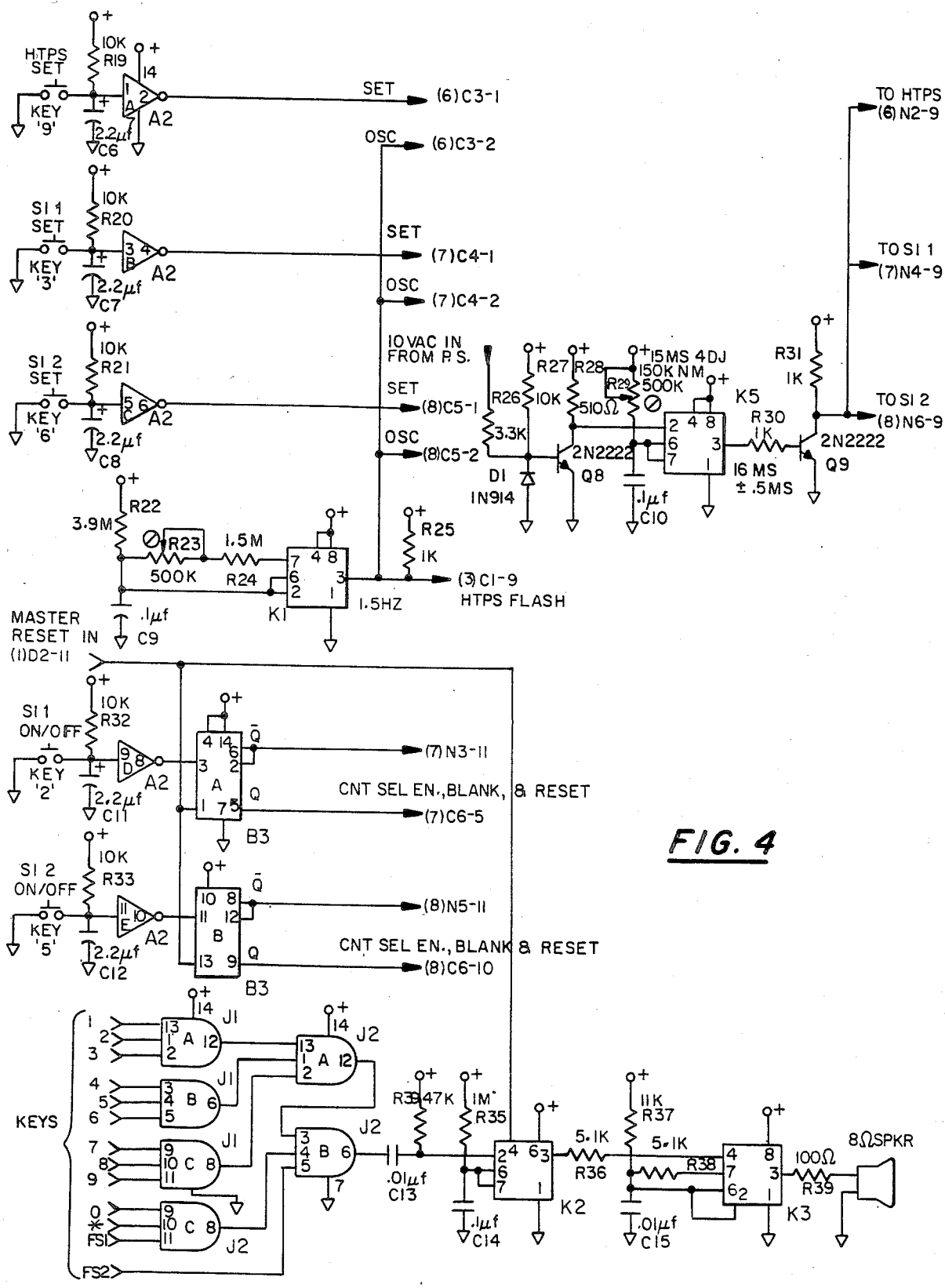
FIG. 4 shows details of the keys and master reset as well as the low voltage hand tool power supply circuitry.
Figure 6:
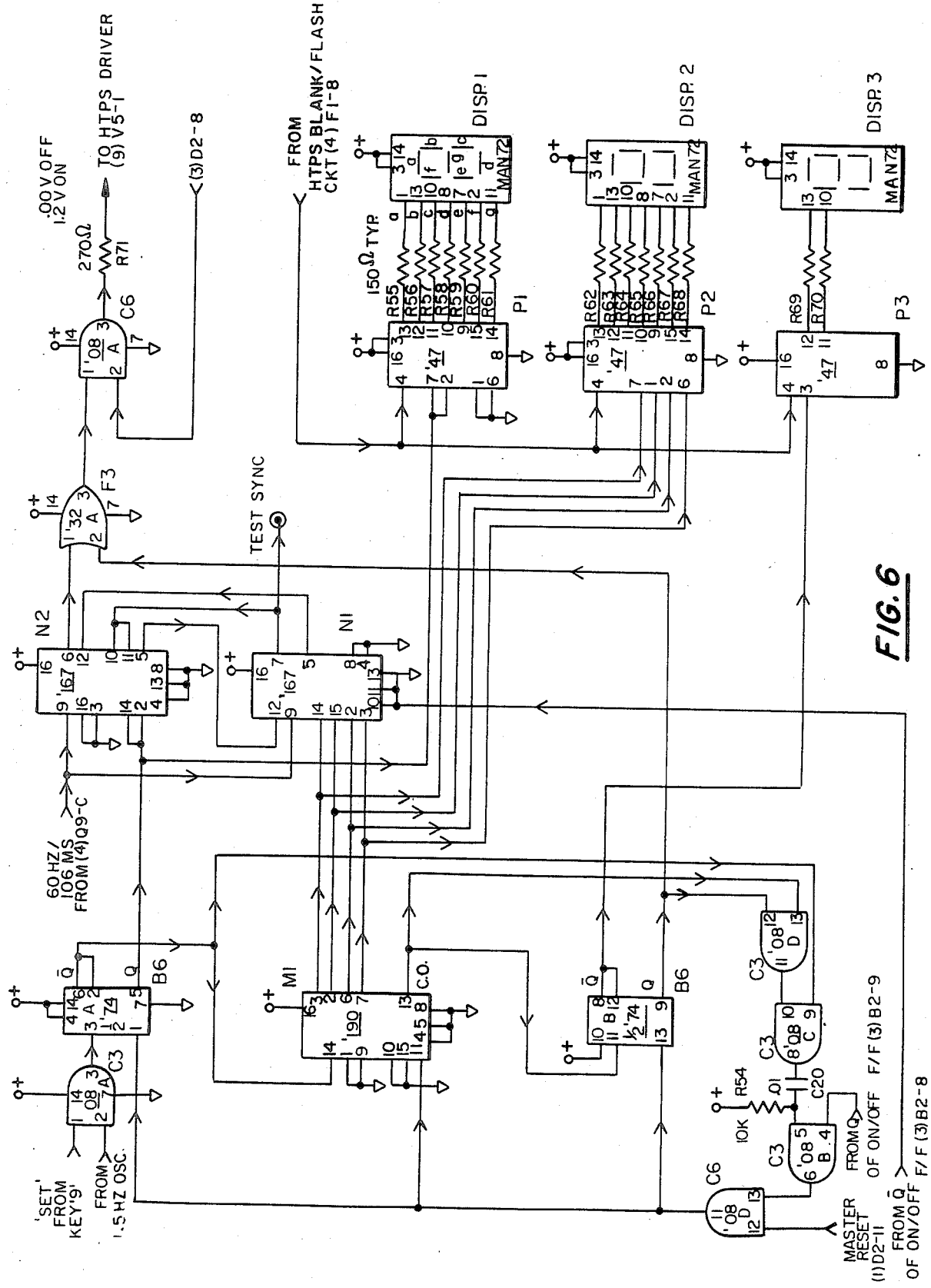
FIG. 6 shows detailed circuitry of the hand tool power supply function.
Figure 7:
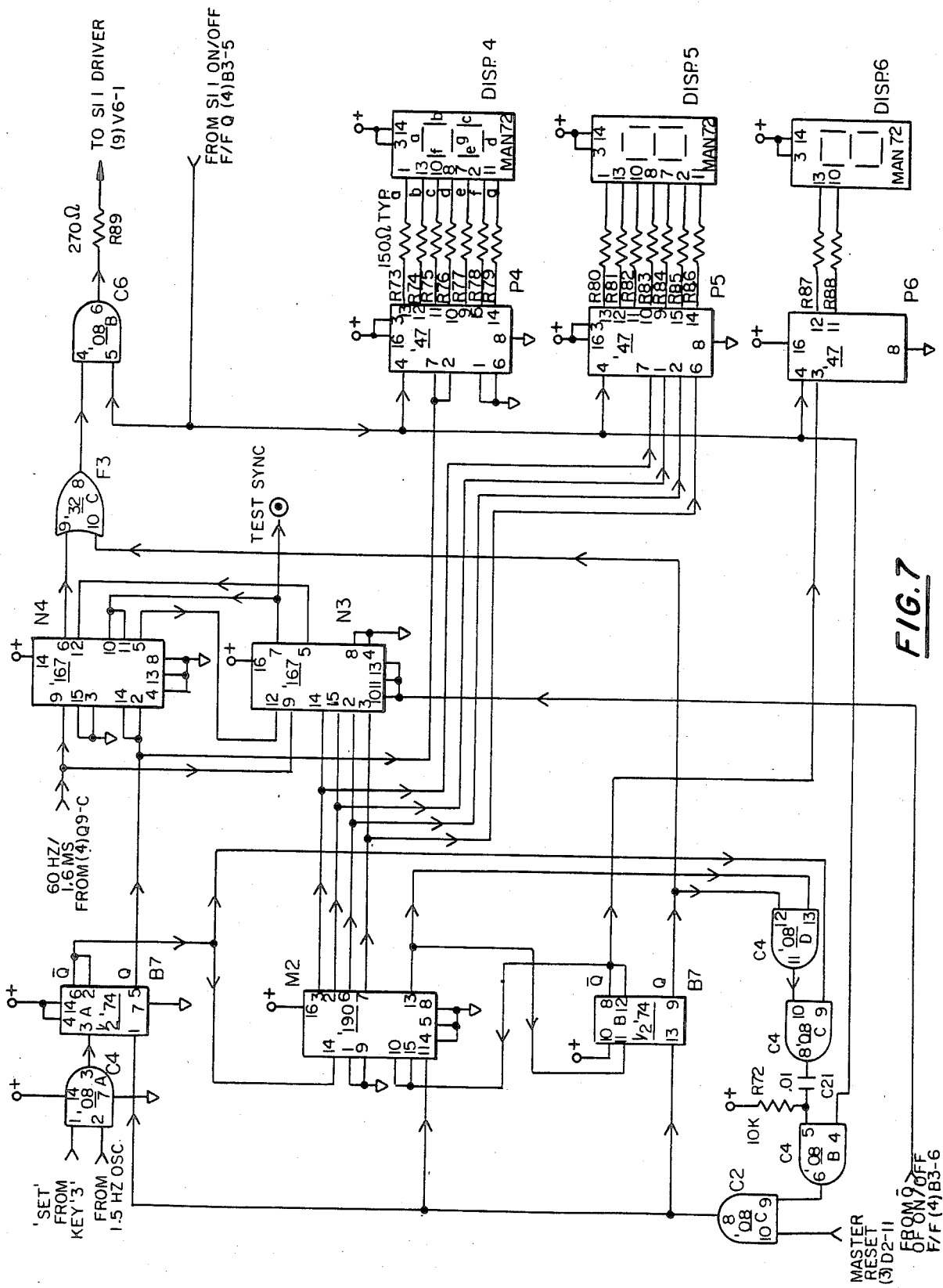
FIG. 7 is a circuit diagram of the SI1 circuits.

Referring now to FIG. 4 of the drawings, key 9 is understood as being a momentary switch that will be further explained in conjunction with the disclosure relating to FIG. 6, key 3 is a momentary switch that will be more fully discussed with respect to the disclosure relating to FIG. 7 and FIG. 6 is a momentary switch that will be discussed in detail with respect to the disclosure FIG. 8. The IC-K1 is the 1.5 Hz oscillator. Its output is utilized in conjunction with key 9, key 3 and key 6 as well as with the HTPS display control stage as mentioned immediately above.

Q8, IC-K5 and Q9 form the line signal conditioner. Ten VAC/60 Hz from the low voltage power supply (LVPS) is squared up by Q8 which triggers a 15 millisecond one shot (0/S)IC-K5 whose output is inverted by Q9. At no signal in, Q8 is slightly forward biased and its collector is low. The positive line cycle has no effect and Q8 collector remains low. Due to the slight forward bias, the negative one-half line cycle requires more time to turn Q8 off than the positive half cycle takes to turn Q8 back on. The result is the collector signal of Q8 is not symmetrical, that is, the positive portion is narrower (rises after 0° of line voltage and falls before 180° of line voltage) than the low portion. IC-K5 triggers "on" on a negative transition and remains "on" for 15 milliseconds. When "on" its output goes high. Since the input trigger to IC-K5 occurs on the negative going portion of Q8's output, it follows that the rising edge of IC-K5's output is coincident with its trigger and therefore occurs just a few degrees before the 180° point in a line cycle. Since the IC-K5 post output is 15 milliseconds wide, it is 1.66 milliseconds less than the duration of one complete line cycle at 60 Hz. This electronic cooperation is critical to enabling an understanding of the operation of the circuits to which the signal is applied. To continue, the IC-K5 output pulse is inverted by Q9 producing a 1.6 millisecond pulse at a 60 Hz rate. This Q9 output then is the signal applied to the HTPS counter, the solder iron 1 (SI-1) counter and to the solder iron 2 (SI-2) counter to be discussed with respect to the disclosure that is relevant to FIGS. 6, 7 and 8 below. In regard to this following disclosure, key 2 enables the SI-1 circuits and key 5 enables the SI-2 circuits. IC-J1-A and B and C and IC-J2-A and B and C form a 13 input "AND" gate. If any input goes low, the output will go low. IC-K2 is a negative edge triggered one shot of one-half second duration. IC-K2 output goes high from the timed period of one-half second. IC-K3 is a gated oscillator that is enabled when its input is high and produces an audible (3,000 Hz) output which drives the output transducer (speaker). This circuit is then the "any key depressed" beep circuit.

Figure 5:
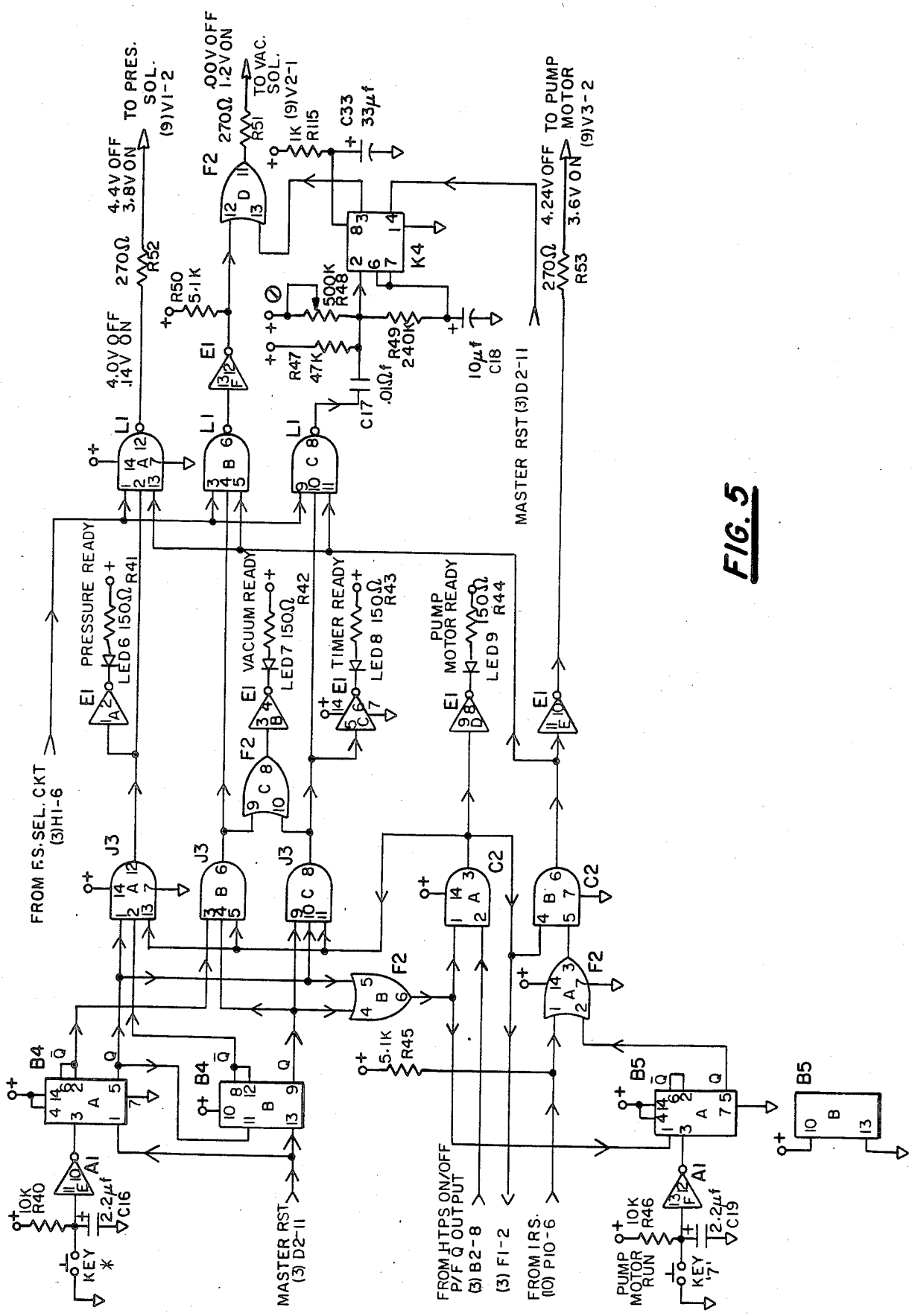
FIG. 5 is a detailed schematic drawing of the pump motor circuits and function selector switches.

Referring now to FIG. 5 of the drawings, key* is not only the on/off switch to enable the pump motor circuits (PMC); it is also the function selector switch. IC-B4-A and B are arranged as a binary counter. The outputs change combinations with each key closure. IC-F2-B decodes these outputs and its output is low only in the selected "off" combination. IC-F2-B therefore is the "on" enable signal source for the PMC. IC-C2-A is part of the function interlock system (FIS) which prevents operation of the PMS whenever the HTPS is on. IC-C2-A receives the "on" enable signal and the FIS signal and outputs an enable signal to the rest of the PMC. IC-J3-A and B and C are arranged as a binary decoder and their outputs represent a desired selected function which are displayed by LED's 6, 7 and 8. LED 9 denotes the PMC is enabled and ready for use as it is enabled by the output of IC-C2-A which also enables the FS select and display circuits as mentioned above with respect to the discussion of the mechanical drive.

IC-C2-B is the output enable gate for all PMC associated functions. One input is the enable signal and the other input is from either the iron rest switch (IRS) or the continuous RUN (RUN) key 7. This gate prevents operation of the solenoids unless the pump motor is running. The pump motor can be energized on demand any time the grounded desoldering iron tip is removed from the IRS and run, key 7, has not been selected. The IRS is a metal rest electrically connected to $+V_{CC}$ via a pullup resistor and is insulated from, but mounted on, the portable work center enclosure, not shown in FIG. 2. The run key 7 simply provides a continuous on enabling signal to bypass the IRS. IC-L1-A and B and C are also output enable gates. Each gate receives an enable signal from IC-C2-B. Each gate also receives an enable signal from the function decoder IC-J3-A and B and C. Each gate also receives a common signal from the FS select circuit. IC-L1-A provides an output to the power stage of the pressure solenoid. IC-L1-B enables IC-F2-D to provide an output signal to the power stage of the vacuum solenoid. IC-L1-C produces a high to low going output to enable IC-K4. IC-K4 is a negative edge triggered one shot of six seconds duration whose output goes high for the timed period. The output of IC-K4 enables IC-F2-D to provide an output signal of six seconds duration to the power stage of the vacuum solenoid. Notice that the timer can be retriggered only by another FS closure which occurs after the initial six second period has elapsed. IC-E1-E provides the output signal to the power stage of the pump motor.

Looking now to FIG. 6 of the drawings, IC-B6-A performs a dual function. It is a register to hold a signal and is also a divide by two counter. IC-M1 is a binary coded decimal (BCD) counter. IC-B6-B performs a dual function. It is a register to hold a signal and is also a divide by two counter. IC-N1 and IC-N2 are programmable decimal rate multipliers (DRM). IC-N1 and IC-N2 are connected in cascade to form a counter which can be programmed to count from zero to ninety-nine. IC-B6-A and IC-M1 provide the count programming for IC-N1 and IC-N2. IC-P1 and IC-P2 are BCD to 7 segment decoder drivers and also receive the coded outputs of IC-B6-A and IC-M1 respectively. IC-P3 is the same as IC-P1 and 2 but obtains its signal from IC-B6-B. Display (DISP) one is the least significant digit (LSD), display 2 is the middle digit and display 3 is the most significant digit (MSD) and they are driven by IC-P1, IC-P2 and IC-P3 respectively. IC-C6-D is a reset gate. IC-C3-B and C form a three input coincident gate to produce a reset pulse to the programmer counters IC-B6-A, IC-M1 and IC-B6-B. IC-C3-A is the "set program" gate. It receives on one input, a continuous 1.5 Hz signal, and on the other input an enable signal from key 9. The output of IC-C3-A is used to "toggle" IC-B6-A. IC-M1 is a positive edge triggered counter. Since IC-B6-A-$\overline{Q}$ output is initially high, the first enabled pulse toggles it low and accordingly the Q output goes high. The second enabled pulse toggles IC-B6-A again, making $\overline{Q}$ high. At this time the count in IC-M1 advances one count. The process continues with IC-M1 advancing only when IC-B6-A $\overline{Q}$ goes high. The decoder drivers display the selected count as it progresses.

Eventually IC-M1 will reach nine and on its next advancement (to count "0"), IC-M1 will output a positive pulse which then toggles IC-B6-B producing a low at IC-B6-B-$\overline{Q}$. This low is decoded as a "1" in the MSD and since at this time IC-M1 outputs are "0", so also is display 2. Also at this time IC-B6-A-Q is low, therefore display 1 is also a "0". Since IC-B6-B-$\overline{Q}$ is low it follows that IC-B6-B-Q is high. This logic 1 is applied to "OR" gate IC-F3A which outputs a high to IC-C6-A. IC-C6-A receives on its input an enable signal from key 8 via IC-D2-C (see drawings and the discussion regarding FIGS. 3A and 3B). IC-D2-A now provides a steady output signal to the power stage of the HTPS. This present state represents 100% or full power and produces 2.5 vac at 40 amps at the HTPS front panel connectors. Closing key 9 to enable one more input pulse will cause a reset pulse to be generated via IC-C3-C and D and IC-C3-B and IC-C6-D which will reset the count programmer to 000.

IC-N2's program inputs alternate its count between "0" and 5 and its output follows. IC-N1's program varies from 0 to 9 and its output follows. IC-N1 and IC-N2 can therefore produce 0 to 95 output pulses for every 100 input pulses. The input pulses are 1.6 milliseconds wide at a 60 Hz rate. The counters invert these to be output pulses of 15 milliseconds which are in sync with the 60 Hz line but at a rate determined by the selected program. The pulses are applied to "OR" gate IC-F3-A then to enabled control gate IC-C6-A which provides a pulsing output signal to the power stage of the HTPS.

In order to understand the importance of these output pulses, both their duration and relationship to the line frequency, it is first necessary to understand the operation of a triac in an AC circuit controlling an inductive load. To turn on a triac with a resistive load, it is necessary only to apply a gate signal briefly; the triac will automatically remain on for the remainder of the one-half line cycle during which it was gated. The next half cycle requires the triac to again be briefly gated on. If the load the triac is controlling is inductive, the current of the load will lag the voltage across it. The triac will not turn off until the current reaches 0. This means the triac will still be on for some period of time into the second half of a line cycle. Normally a "0 voltage switch" can be used to gate a triac but not with an inductive load. What is required is to apply the gate signal longer than the phase lag of the inductive current. In the PWC, only full cycles are desired for AC control. A gate signal which is in sync with the AC line, is available slightly before the voltage 0 crossing and slightly after the current 0 crossing but has a duration of less than one full line cycle (16.66 milliseconds) fits this need. The triac is turned on at 0 volts, the gate signal maintains through all the first half cycle and most of the second half then turns off; the triac then will turn off a few milliseconds later and be ready for its next gate pulse. When line voltage and load current are both 0, they produce no turn on transients. Production of transient is avoided and the possibility of damage to interconnected components and circuit boards is avoided.

Figure 8:
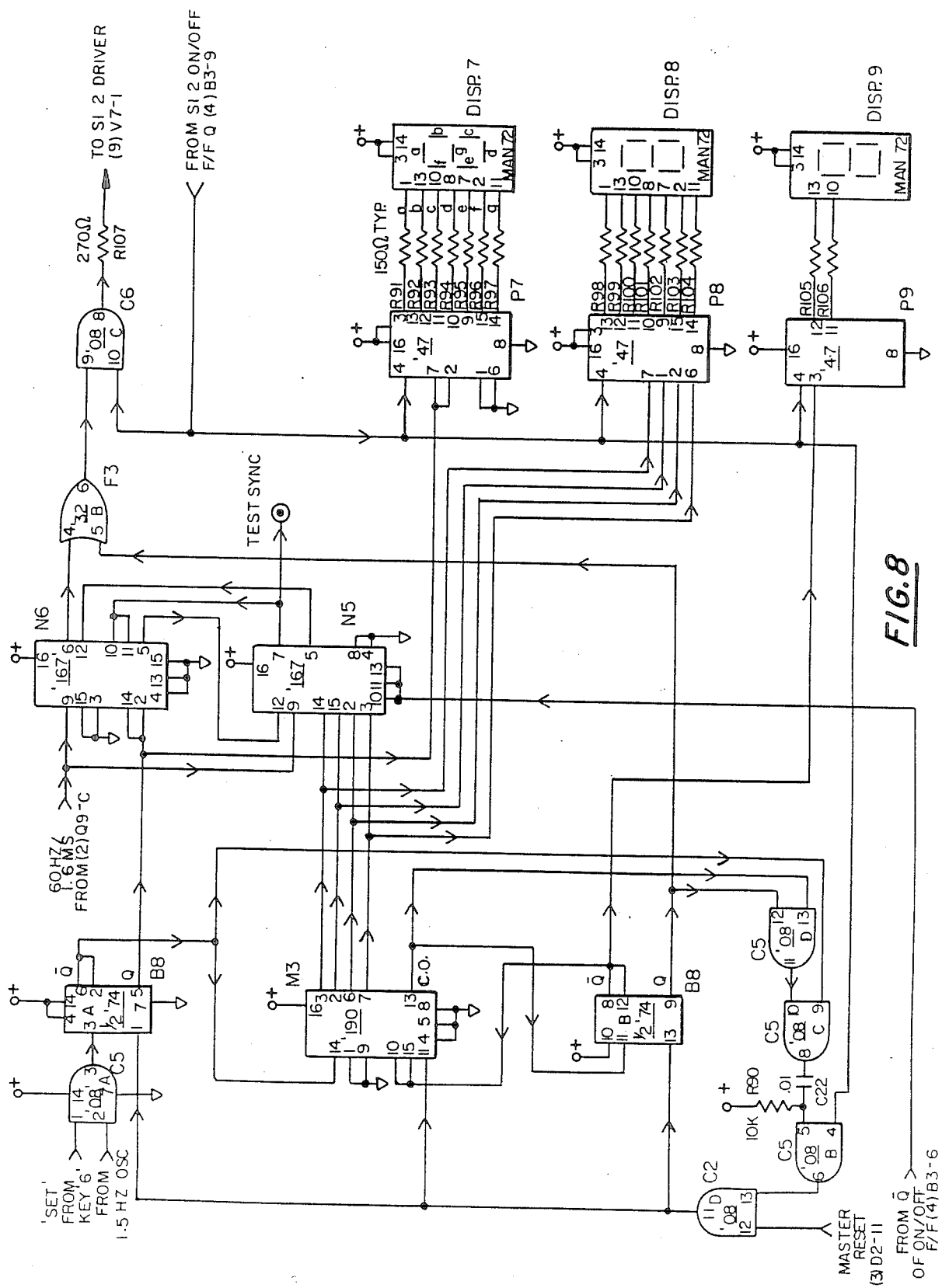
FIG. 8 is a circuit diagram of the constituents of the SI2 function.

Referring now to FIG. 7 and 8, the SI-1 and SI-2 circuits are almost identical to the HTPS. The differences are: in the HTPS the display flashes but not in SI-1 or SI-2; HTPS counts from 0 to 100 but the SI circuits count from 50 to 100. The reason for this is to allow immediate "standby" level voltage to the soldering irons as well as the fact that the soldering irons would be useless at lower power levels. Finally, each function has its own "on" and "set" key, a common 1.5 Hz "set" signal and a common conditioned line signal.

Figure 9:
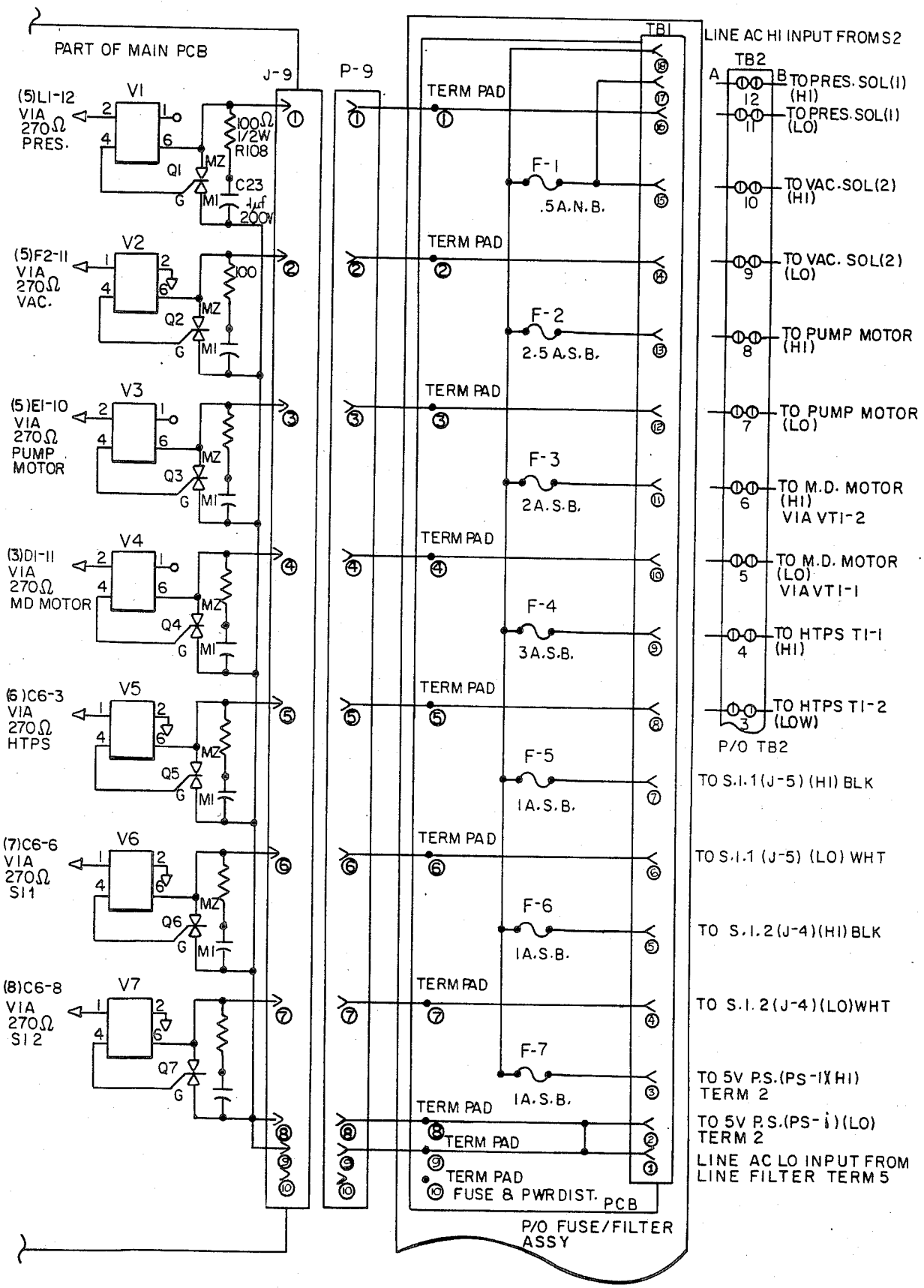
FIG. 9 shows overload and circuit protective details of the portable work center.

The arrangement of FIG. 9 depicts the fusing and AC high inputs to the portable work center. The fuse and filter assemblies are interposed between the PWC and the work implements normally used for a printed circuit board repair to protect both the work implement and the portable work center itself. Details of the couplings are shown more explicity in FIG. 10.

Obviously, many modifications and variations of the present invention are possible in the light of the above teachings. It is therefore to be understood that within the scope of the appended claims the invention may be practiced otherwise than as specifically described.

I claim:
1. A self-contained, electronic electromechanical work center for servicing printed circuit boards comprising:
   means for adjusting solder iron temperatures;
   means for varying a pressure differential;
   means for providing mechanical rotary drive power;
   means for applying low voltage hand tool power;
   means for providing an auxiliary controlled power outlet;
   an alternate foot switch control unit for selectively coupling to the low voltage hand tool power supplying means, the mechanical rotary drive power providing means and the varying pressure differential means;
   means for digitally controlling the function selection of the portable work center mounted on a front panel thereof;
   means for preventing operation of the varying pressure differential means whenever the low voltage hand tool power supplying means is on; and
   means for preventing operation of the foot switch unless the pump motor is running and being operatively coupled therewith.

2. An apparatus according to claim 1 further including:
   solid state control logic circuits for operation of the portable work center.

3. An apparatus according to claim 2 further including:
   means for digitally displaying the status of the portable work center.

4. An apparatus according to claim 3 in which the soldering iron temperature adjusting means includes on-off functions for two receptacles on the front panel each adapted to be coupled to a soldering iron, and a varying temperature control (wattage output operatively coupled to each receptacle).

5. An apparatus according to claim 4 in which the pressure differential varying means is a pressure/vacuum pump device having a fitting on the front panel to fit with pressure lines.

6. An apparatus according to claim 5 in which the mechanical rotary drive power providing means is a motor coupled to a fitting on the front panel that is adapted for connection with a variety of rotary drive tools.

7. An apparatus according to claim 6 in which the digital controlling means is a key button pad operatively associated with a digital readout.

* * * * *